No. 910.  
PATENTED SEPT. 12, 1838.

S. STIMPSON.  
APPARATUS FOR THE APPLICATION OF ELECTROMAGNETISM AS A MOTIVE POWER.

UNITED STATES PATENT OFFICE.

SOLOMON STIMPSON, OF NEW YORK, N. Y.

IMPROVED APPARATUS FOR THE APPLICATION OF ELECTRO-MAGNETISM AS A MOTIVE POWER.

Specification forming part of Letters Patent No. 910, dated September 12, 1838.

*To all whom it may concern:*

Be it known that I, SOLOMON STIMPSON, of the city of New York, in the State of New York, have invented certain Improvements in the Apparatus for Applying Electro-Magnetism as a Motive Power; and I do hereby declare that the following is a full and exact description thereof.

Figure 2:
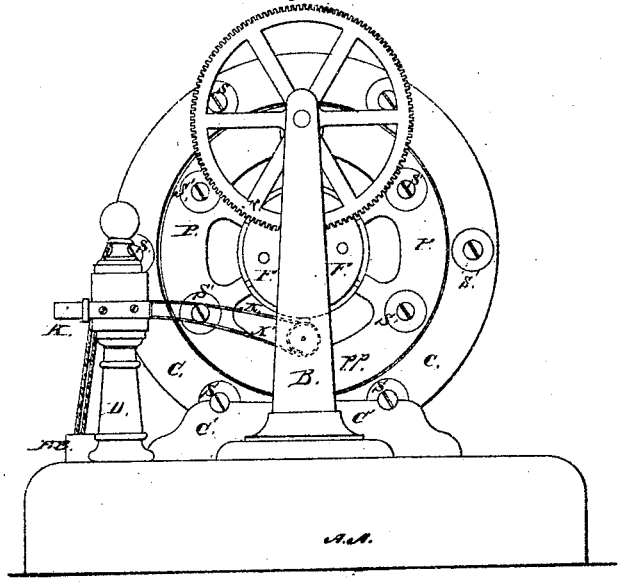
Figure 1:
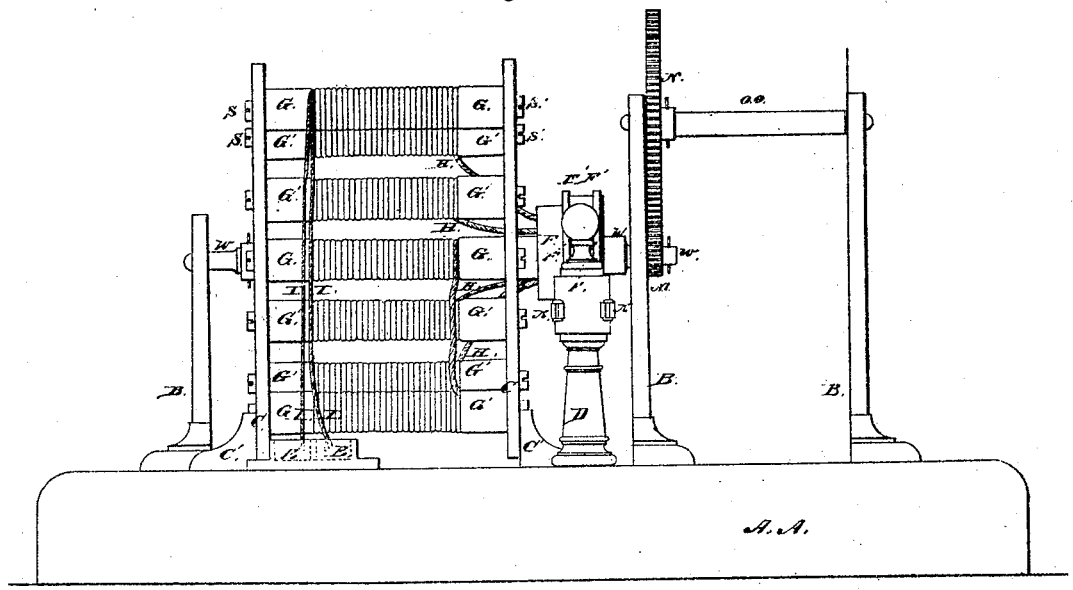

Figure 1 is a side view, and Fig. 2 an end view, of my machine, and in each of these figures where like parts are represented they are designated by the same letters of reference.

A A is a piece of plank or other suitable material, which constitutes the base of the machine.

B B B are three brass pillars supporting the shaft of the revolving system of magnets and the geared wheels M N; C C, two circular brass rims, to which the poles of the stationary magnets are attached by screws S S S S  These rims are annular plates, and firmly screwed to the base of the machine by a broad base, $c'$ $c'$.

The number of magnets in the stationary and revolving system, as seen in Fig. 2, is twelve. Those of the stationary magnets G G G are here represented. These magnets, with the exception of the cylindrical poles or heads G G, are covered with several layers of insulated copper wire in the usual manner. The wires of all the stationary magnets are connected terminally with mercury-cells E E by the insulated fasciculi of wires I I. The insulated cells E E are for battery-comunications.

$G'$ $G'$ $G'$ $G'$ represent four of the interior revolving magnets secured to the shaft W W in a manner to be shortly described. These magnets are covered in the same way as the stationary magnets above described. The extremities of the wires are twisted into fasciculi, which are represented at H H H H as passing out to be connected with the pole-changer F. The galvanic current is not distributed to the revolving magnets individually, but they are charged by pairs, the magnets of each being charged in sequence; hence two of the conducting-fasciculi H H suffice for the positive and negative connections of two magnets.

F F F represent the pole-changer fixed to the shaft, by means of which the poles of the revolving system of magnets are changed when the machine is in motion. It consists, chiefly, of two sectional portions, F F, insulated from each other. These portions are composed each of six metallic segments insulated from each other by ivory or some other convenient non-conducting substance. Each segment of one portion is connected metallically with the next succeeding segment of the other portion.

K K are the ends of conducting-springs secured to the wooden pillar D. The extremities of these springs rest on the segments of the portions $F'$ $F'$. The openings at K K are to admit conducting wires or slips from the poles of a second battery of greater power than that applied to the stationary magnets. The operation of changing poles is as follows: The extremities of three of the fascicles of wires being connected with one of the segments of a portion, $F'$, they must also be connected with the next succeeding segment of the other side $F'$, and also with the next alternate segment of the some portion, and the connection thus continues around the pole-changer. The same is true with the three other fasciculi. The whole briefly amounts to crossing the extremities of the wires (of the revolving magnets) in each two succeeding segments. The extremities of the springs K K resting upon two opposite segments represent two permanent battery-polls, and as the system revoles the two opposite extremities of the wires are presented in alternate order to the same battery-pole, and thus a change of magnetic poles is effected.

M is a small cog-wheel attached to the shaft W W of the revolving system.

N is a larger wheel in the circumference of which plays the wheel $m$; O O, the shaft of the wheel N from which the power of the machine may be estimated or applied.

Fig. 2 is an end view of the machine.

S S S represent the outer rim of brass, to which are secured by the screws S S S the extremities of the stationary magnets; P P, the inner concentric brass wheel attached to the shaft, and to which are secured by the screws $s$ $s$ $s$ $s$ the heads of the revolving magnets; F F, a view of one portion of the pole-changer with its six insulated metallic segments; K K, one of the conducting-springs resting on the pole-changer; $K'$, a second spring with a coiled end, $o$, to regulate the pressure of K K.

An iron shaft, W W, connects the two revolving wheels P P situated within the stationary rims c c, as before described. The shaft W carries a pinion, M, which gears with the cog-wheel N; but the construction of this and various other parts of the machine may be changed without in any degree varying the principle of action upon which the machine is dependent. The number of revolving and of stationary magnets may likewise be varied as may be preferred, the pole-changer being, of course, adapted thereto.

The battery and its connections need not be described, as I do not claim to have invented anything relating thereto, but intend to employ any of the known kinds which I may find most suitable.

The characteristic feature of my apparatus is the employment of straight electro-magnets, both revolving and stationary, the axes of all the magnets employed being parallel to each other, by which arrangement a greater power is obtained than with magnets of any other description.

What I claim, therefore, as constituting my invention is—

The employment of straight magnets connected and combined substantially in the manner above set forth, (and it is to be understood that although I have spoken of revolving and stationary magnets the other circle of magnets may be made to revolve as well as the inner, but, as I apprehend, without any advantage,) while the machine would be rendered complex.

In witness whereof I, the said SOLOMON STIMPSON, hereto subscribe my name in the presence of the witnesses whose names are hereto subscribed on the 23d day of July, 1838.

SOLOMON STIMPSON.

Witnesses:
HENRY SALISBURY,
M. J. THOMAS.